(12) United States Patent
Oshima

(10) Patent No.: US 6,615,477 B2
(45) Date of Patent: Sep. 9, 2003

(54) METHOD AND APPARATUS FOR PROCESSING WORKPIECE BY USING X-Y STAGE CAPABLE OF IMPROVING POSITION ACCURACY

(75) Inventor: Toru Oshima, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/984,828

(22) Filed: Oct. 31, 2001

(65) Prior Publication Data

US 2002/0180133 A1 Dec. 5, 2002

(30) Foreign Application Priority Data

Jun. 1, 2001 (JP) ........................................ 2001-167209

(51) Int. Cl.⁷ ................................................. B23P 7/00
(52) U.S. Cl. ............................. 29/559; 263/73; 263/60
(58) Field of Search ............................. 269/73, 71, 60, 269/178, 61, 289 R, 309

(56) References Cited

U.S. PATENT DOCUMENTS

| | | | |
|---|---|---|---|
| 4,358,198 A | * 11/1982 | Moriyama et al. | 269/60 |
| 4,492,356 A | * 1/1985 | Taniguchi et al. | 269/60 |
| 4,766,465 A | * 8/1988 | Takahashi | 269/60 |
| 4,896,869 A | * 1/1990 | Takekoshi | 269/60 |
| 5,022,619 A | * 6/1991 | Mamada | 269/60 |
| 5,523,941 A | * 6/1996 | Burton et al. | 269/60 |
| 5,760,564 A | * 6/1998 | Novak | 269/60 |

\* cited by examiner

Primary Examiner—Lee D. Wilson
(74) Attorney, Agent, or Firm—Armstrong, Westerman & Hattori, LLP

(57) ABSTRACT

A workpiece to be processed is placed and fixed to an X-Y stage capable of translation motion along X-and Y-axis directions orthogonal to each other. The X-Y stage is moved to a first position. The X-Y stage is approach-run in the X-axis direction and in a negative Y-axis direction and stopped at a second position. The workpiece is processed while the X-Y stage stops at the second position. The process of moving the X-Y stage in the negative Y-axis direction by some distance and processing the workpiece while the X-Y stage stops, is repetitively executed. Even if the regularity of motion of the X-Y stage is disturbed, it is possible to suppress a lowered stage position accuracy.

6 Claims, 7 Drawing Sheets large at the evaluation direction). This may be ascribed to that the motion

METHOD AND APPARATUS FOR PROCESSING WORKPIECE BY USING X-Y STAGE CAPABLE OF IMPROVING POSITION ACCURACY

CROSS REFERENCE TO RELATED APPLICATION

This application is based on and claims priority on Japanese patent application 2001-167209, filed on Jun. 1, 2001, the whole contents of which are incorporated herein by reference.

BACKGROUND OF THE INVENTION

A) Field of the Invention

The present invention relates to a method and apparatus for processing a workpiece by using an X-Y stage, and more particularly to a method and apparatus for processing a workpiece capable of high position accuracy of a workpiece placed on and fixed to an X-Y stage.

B) Description of the Related Art

Fine patterns of reticles and masks used for photolithography processes of semiconductor integrated circuit devices are written by an electron beam, a laser beam or the like. A plurality of unit areas (fields) are defined on the plane of a substrate of a reticle or mask. For example, a desired pattern can be written in one unit area by scanning an electron beam. Desired patterns can be written in all unit areas by fixing a substrate to an X-Y stage and moving the substrate in an X-Y plane.

Generally, a plurality of unit areas are disposed in a matrix in the plane of a substrate on which desired patterns are written. A substrate is fixed to the X-Y stage so that the row and column directions along which unit areas are disposed are made in parallel to the X- and Y-axes of the X-Y stage. A plurality of columns disposed along the X-axis direction and a plurality of rows disposed along the Y-axis direction are respectively given sequential numbers starting from 1, and a unit area at the column number i and the row number j is represented by U (i, j).

A pattern is written first in the unit area U (1, 1), and then the X-Y stage is moved along the Y-axis direction to thereafter write a pattern in the unit area U (1, 2). This operation sequence is repeated to write patterns in all unit areas of the first column. After the patterns are written in all unit areas of the first column, the X-Y stage is moved along the direction opposite to the Y-axis direction while it is also moved along the X-axis direction to thereafter write a pattern in the unit area (2, 1). Similar to the operation sequence of writing patterns in the unit areas of the first column, patterns are written in the unit areas of the second column. Similarly, patterns are thereafter written in unit areas of the third to following columns.

The position accuracy of the X-Y stage moved by the above-described operation sequence was evaluated. Evaluation points (patterns) were disposed in a 15×15 matrix in a pitch 8.75 mm both in the X- and Y-axis directions, in a square area of 122.5 mm×122.5 mm of a plane of the X-Y stage. Of the evaluation points disposed in the matrix pattern, the evaluation points disposed along the column direction are given sequential numbers starting from the leftmost column, and the evaluation points disposed along the row direction are given sequential numbers starting from the lowest row. An evaluation point at the i-column and i-row is represented by P(i, j). This evaluation model corresponds to the case that unit areas are disposed in a matrix pattern of 15 rows×15 columns.

FIG. 5 is a diagram illustrating a displacement pattern of evaluation points. The horizontal direction in FIG. 5 corresponds to the X-axis and the vertical direction corresponds to the Y-axis direction. The positive direction of the X-axis is rightward in FIG. 5, and the positive direction of the Y-axis is upward. The evaluation point P (1, 1) at the lowest left is moved to a reference point to detect a displacement amount between the evaluation point P (1, 1) and reference point. Next, a displacement amount at each evaluation point is detected while the evaluation point to be positioned at the reference point is sequentially moved along the positive Y-axis direction (while the X-Y stage is moved along the negative Y-axis direction).

After the evaluation point P (i, 15) at the uppermost row reaches the reference point, the target measurement position is moved along the positive X-axis direction by one column and along the negative Y-axis direction (the X-Y stage moves along the negative X-axis direction and along the positive Y-axis direction) until the evaluation point P (i+1, 1) at the lowest row reaches the reference point. Thereafter, the displacement amount at each evaluation point is detected sequentially from the evaluation point P (i+1, 1) at the lowest row to the evaluation point P (i+1, 15) at the uppermost row. This operation sequence is repeated until the displacement amounts at all evaluation points are detected.

In the example shown in FIG. 5, the pattern positioning accuracy was 53 nm (3σ) in the X-axis direction and 44 nm (3σ) in the Y-axis direction. Especially, it can be seen that the displacement amounts become large at the evaluation points P (i. 1) at the lowest row (start points in the positive Y-axis direction). This may be ascribed to that the motion style of the X-Y stage is different between the start points P (i, 1) and other evaluation points. In other words, the evaluation points (start points) reach the reference point while the X-Y stage moves obliquely upper left, whereas the other evaluation points (other than the start points) reach the reference point while the X-Y stage moves straight down.

In order to reduce the displacement amount at the start point, an X-Y stage approach running method has been proposed by which the X-Y stage moves toward the reference point from a position apart from some distance along the positive Y-axis direction where the start point P (i, 1) positions. With this method, the evaluation points (start points) also reach the reference point while the X-Y stage moves straight down.

FIG. 6 is a diagram showing a placement accuracy of evaluation points when the X-Y stage approach running method is shown. The approach running distance was set to 8.75 mm same as the pitch of evaluation points. The approach running distance is a distance to the start point from a point where the X-Y stage motion direction along the Y-axis direction is reversed. It can be seen that the displacement amounts at the start points are reduced when the approach running method is used more than when it is not used. The pattern positioning accuracy is 27 nm (3σ) in the X-axis direction and 35 nm (3σ) in the Y-axis direction, especially, which were improved more than those shown in FIG. 5.

In the reticle production, all unit areas are not always disposed in a correct matrix pattern, nor Y-coordinate values of all start points are coincident.

FIG. 7 is a diagram showing an example of displacements when unit areas are not disposed in a correct matrix pattern. Evaluation points P (i, j) are disposed in a 13×13 matrix pattern, and the pitch of the evaluation points is 8.75 mm in both the X- and Y-axis directions. In order to disturb the regularity of motion of the X-Y stage, twelve pass points Q (m, n) (m=1, 2, 3, 4, n=1, 2, 3) indicated by black circles in FIG. 7 are disposed. The pass points Q (m, n) are disposed at positions where evaluation points P (4m−3, 4n−2) are displaced by a half pitch along the negative X-axis direction.

First, the X-Y stage is moved so that the pass points Q (1, 1), Q (1, 2) and Q (1, 3) are sequentially positioned at the reference point. After the pass point Q (1, 3) reaches the reference point, the evaluation point P (1, 1) is moved to the reference point by using the X-Y state approach running method. A motion of the X-Y stage between the columns where the pass points are not disposed, is similar to the method described with FIG. 6.

In the following, the motion from a column to another column, between which columns the pass points are disposed, e.g., the motion from the 4n-column to the (4n+1)-column, will be described. After the evaluation point P (4n, 13) is moved to the reference point, the pass points Q (n+1, 1), Q (n+1, 2) and Q (n+1, 3) are sequentially moved to the reference point. Thereafter, the evaluation point P (4n+1, 1) is moved to the reference point by using the X-Y stage approach running method.

As shown in FIG. 7, it can be seen that the displacement amounts of evaluation points become larger than those shown in FIG. 6. The pattern positioning accuracy was 35 nm (3σ) in the X-axis direction and 90 nm (3σ) in the Y-axis direction, especially, which showed a worse position alignment than that shown in FIG. 6. This results from disturbance of the regularity of motion of the X-Y stage.

SUMMARY OF THE INVENTION

It is an object of the present invention to provide a method for processing a workpiece by using an X-Y stage capable of suppressing a lowered stage position accuracy even if the regularity of motion of the X-Y stage is disturbed.

According to one aspect of the present invention, there is provided a processing method comprising: a step of holding a workpiece to be processed on an X-Y stage capable of translation motion along X-axis direction and Y-axis direction orthogonal to each other; a step of moving the X-Y stage to a first position; a step of approach-running the X-Y stage in the X-axis direction and in a negative Y-axis direction and stopping the X-Y stage at a second position; a step of processing the workpiece while the X-Y stage stops at the second position; and a step of repetitively executing a process of moving the X-Y stage in the negative Y-axis direction by some distance and processing the workpiece while the X-Y stage stops.

According to another aspect of the present invention, there is provided an X-Y stage system having a controller for executing the processing method.

Even if the regularity of motion of the X-Y stage is disturbed, it is possible to suppress a lowered stage position accuracy.

DETAILED DESCRIPTION OF THE PREFERRED EMBODIMENT

Figure 1:
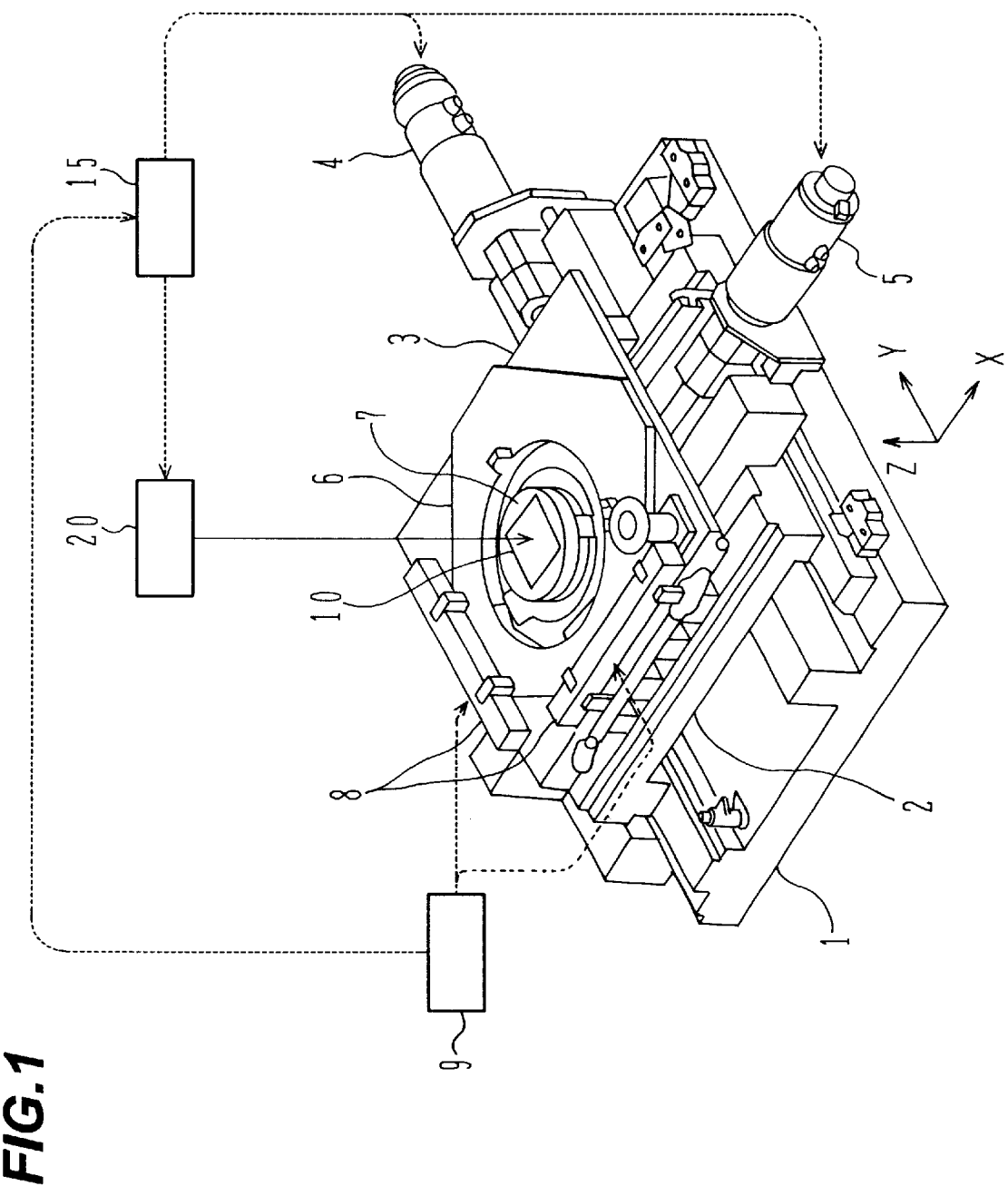
FIG. 1 is a perspective view of a stage system used by an embodiment of the invention.

FIG. 1 is a perspective view of a stage system used by a processing method according to an embodiment of the invention. On a base 1, a Y-stage 2 is mounted via a linear guide in such a manner that it can perform translation motion along the Y-axis direction. A servomotor 4 makes the Y-stage 2 move in the Y-axis direction. On this Y-stage 2, an X-stage 3 is mounted via a linear guide in such a manner that it can perform translation motion along the X-axis direction. A servomotor 5 makes the X-stage 3 move in the X-axis direction.

On this X-axis stage 3, a tilt stage 6 is mounted and a ΘZ stage 7 is mounted on the tilt stage 6. The tilt stage 6 adjusts the inclination angle of the ΘZ stage 7 relative to the X-Y plane. A substrate 10 to be processed is placed on and fixed to the plane of the ΘZ stage 7. The ΘZ stage 7 rotates the substrate 10 around the Z-axis orthogonal to the X-Y plane. By driving the servomotors 4 and 5, the ΘZ stage 7 can perform translation motion in the X- and Y-axis directions. In this specification, the ΘZ stage 7 capable of translation motion in the X- and Y-axis directions may be called an X-Y stage.

X- and Y-axis laser interference mirrors 8 are mounted on the tilt stage 6. A laser interference meter 9 can measure the positions of the tilt stage 6 in the X- and Y-axis directions. The measurement results of the positions of the tilt stage 6 by the laser interference meter 9 are input to a controller 15 which controls the servo motors 4 and 5.

A processing system 20 processes the substrate 10 placed on and fixed to the plane of the ΘZ stage 7. For example, the substrate 10 may be a reticle substrate, a mask substrate, a semiconductor substrate or the like, and the processing system 20 may be an electron beam writing system. The electron beam writing system directly exposes a resist coated on the surface of the substrate. Alternatively, the substrate 10 may be a semiconductor substrate and the processing system 20 may be a reduction projection aligner.

Next, with reference to FIG. 2, a method of driving the stage system will be described, the method being adopted by the embodiment processing method. A plurality of unit areas (fields) to be processed are defined in the surface of the substrate placed on and fixed to the plane of the ΘZ stage 7 shown in FIG. 1. The processing system 20 can process each unit area under the condition that the position of the substrate 10 is fixed. For example, by scanning an electron beam, a desired pattern can be written in each unit area. The position where the processing system 10 can process each unit area of the substrate 10 when the substrate 10 is fixed to some position, is called a processible position.

Figure 2:
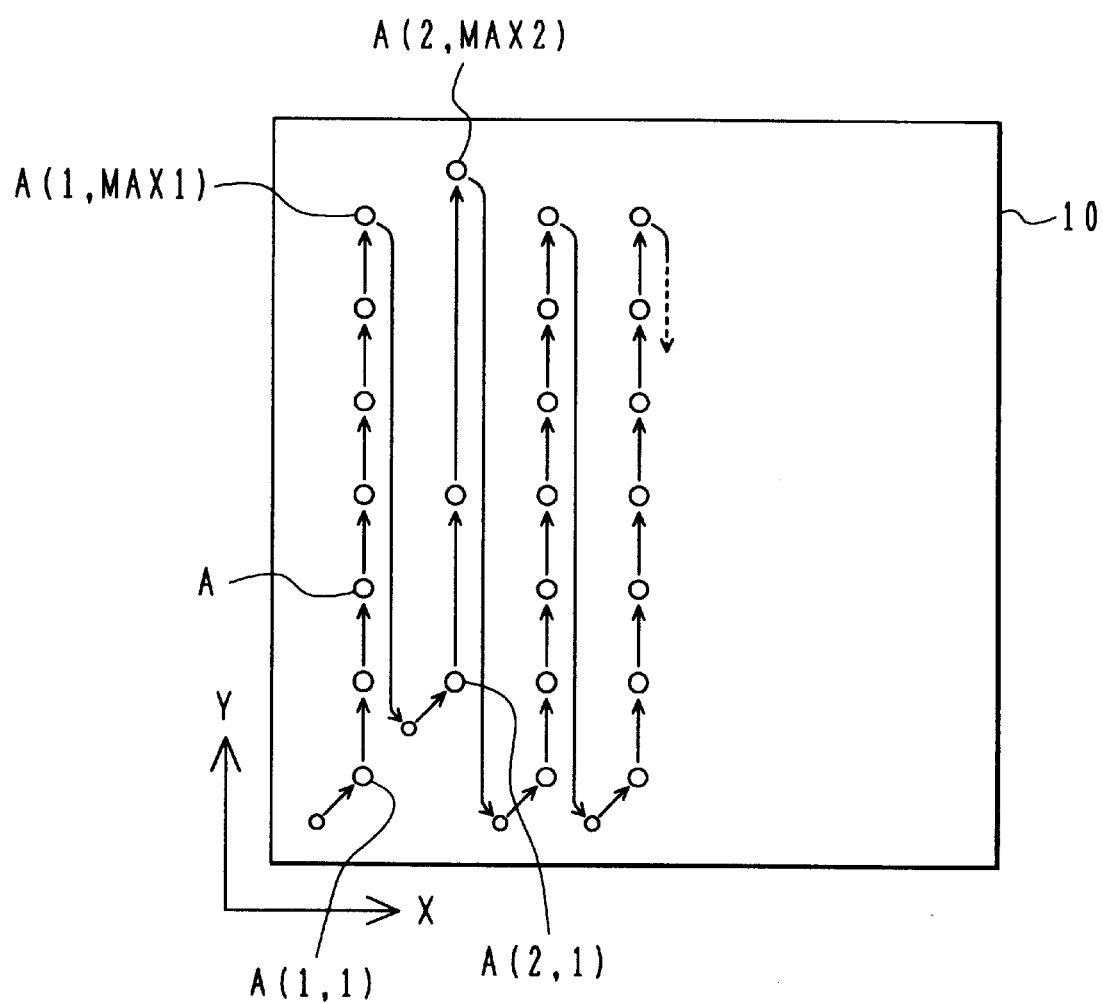
FIG. 2 is a diagram illustrating a method of moving an X-Y stage, the method being adopted by an embodiment processing method of the invention.

FIG. 2 shows a motion of the processible position in the plane of the substrate 10. In FIG. 2, each unit area is represented by a white circle A drawn in the unit area. A representative point A of each unit area is simply called a unit area. A plurality of unit areas A are placed in parallel to the Y-axis to constitute one column. A plurality of rows of unit areas A are placed at an arbitrary interval in the X-axis direction. The layout of unit areas A in each column is not necessarily constant, but it may be different for each column.

The servo motors 4 and 5 are driven to move the ΘZ stage 7 so that the processible position is moved (approach-run) obliquely upper right to the unit area A(1, 1) in the leftmost column (column having the smallest X-coordinate value) and in the lowest unit area (unit area having the smallest Y-coordinate value). The unit area A(1, 1) positioned at the processible position is processed.

Thereafter, the processible position is sequentially moved to the unit areas in the same column of the unit area A(1, 1) in the order of a smaller Y-coordinate value. After the process for the uppermost unit area A(1, MAX1) (unit area having the largest Y-coordinate value) is completed, the ΘZ stage 7 is moved so that the processible position is positioned obliquely lower left from the lowermost unit area A (2, 1) in the next right column. The ΘZ stage 7 is approach-run from this position so that the unit area A (2, 1) is positioned at the processible position. Thereafter, similar to the first column, the unit areas in the same column as the unit area A (2, 1) are processed.

Figure 3:
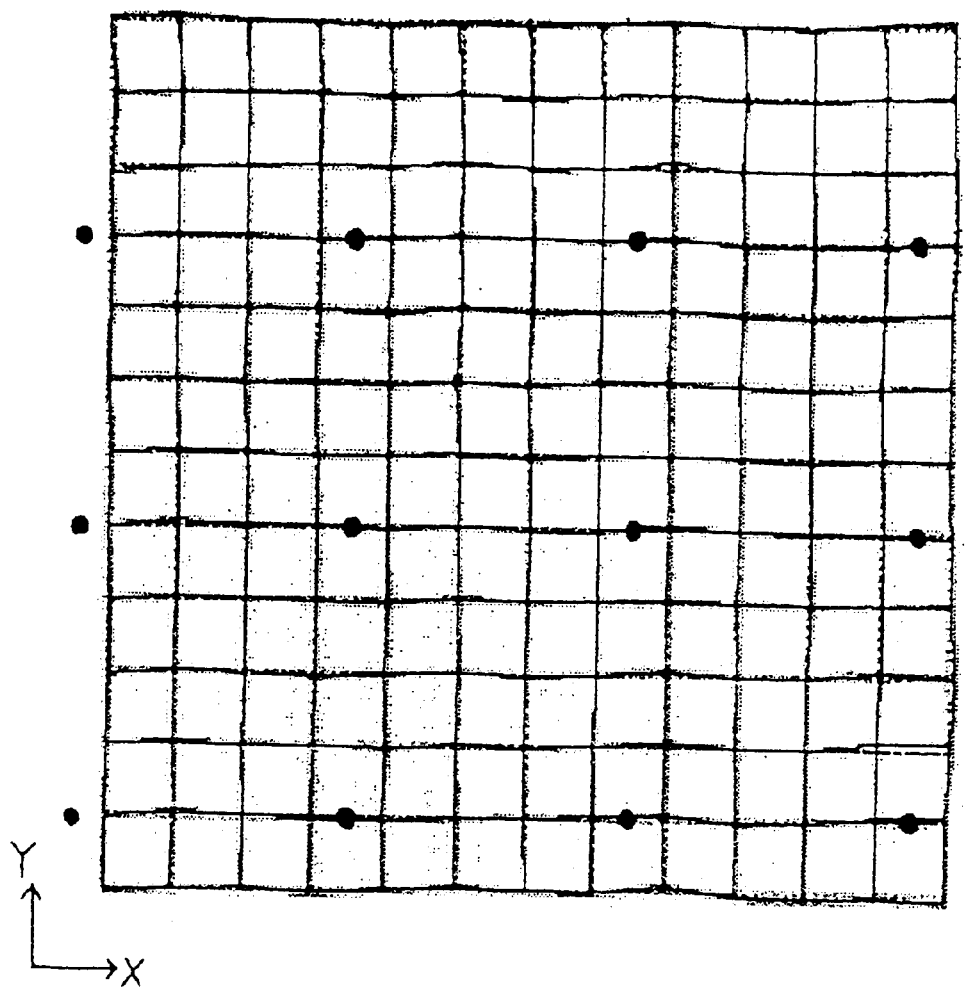
FIG. 3 is a diagram showing a placement accuracy (displacement amount) of an X-Y stage using the embodiment method of the invention.

FIG. 3 is a diagram showing the placement accuracy of evaluation points when the driving method described with reference to FIG. 2 is used. The evaluation points and pass points are the same as those shown in FIG. 7. Each unit area is positioned at each of evaluation points and pass points. When each unit area at the lowermost position in each of the pass point column and evaluation point column is moved to the processible position, the ΘZ stage 7 is approach-run as shown in FIG. 2 in such a manner that the processible position moves in the substrate plane obliquely from lower left to upper right.

Figure 7:
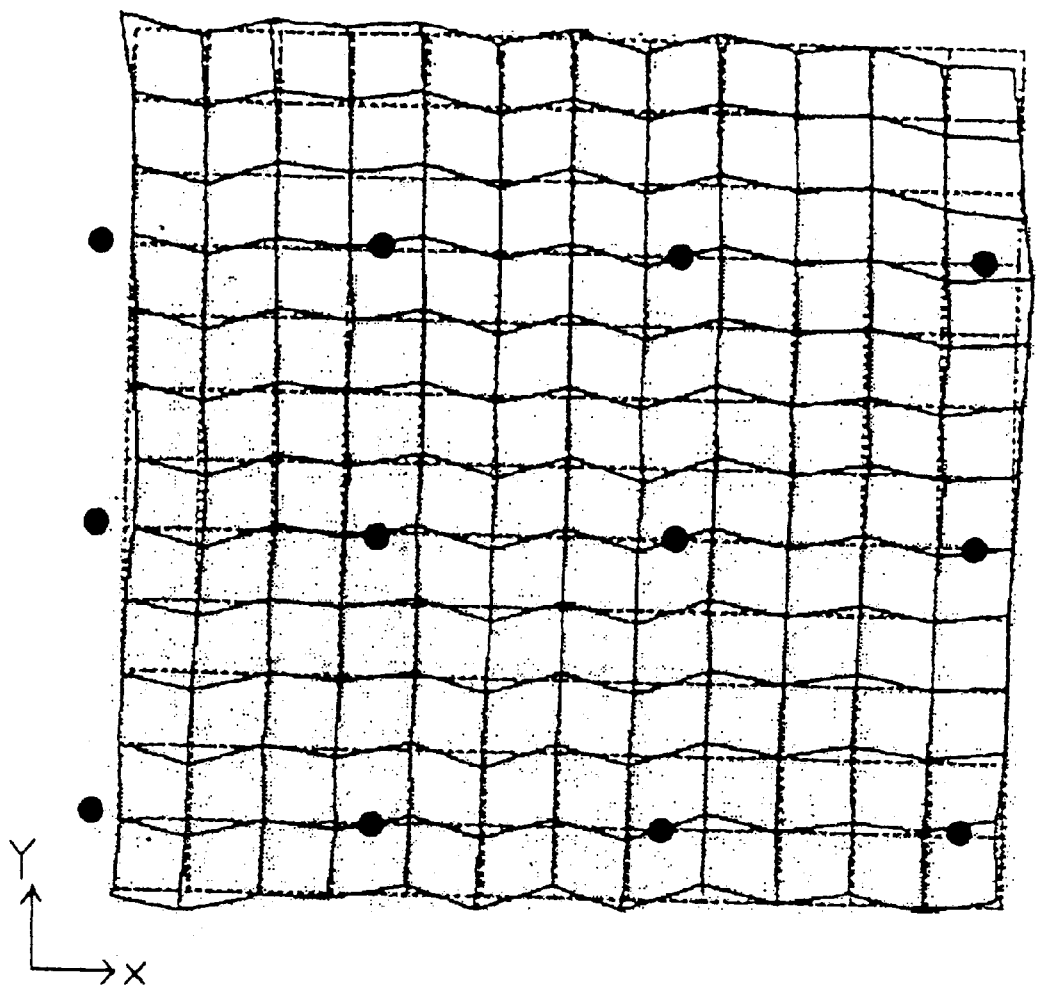
FIG. 7 is a diagram showing the placement accuracy when an X-Y stage is moved by the conventional approach running method under the condition that the regularity of motion of the X-Y stage is disturbed.

It can be seen from a comparison between FIGS. 3 and 7 that the placement accuracy at each evaluation point is improved considerably. According to the evaluation results shown in FIG. 3, the pattern positioning accuracy was 18 nm (3σ) in the X-axis direction and 27 nm (3σ) in the Y-axis direction especially.

In the following, the reason why the position accuracy is improved by the oblique stage approach run will be described.

Figure 4A:
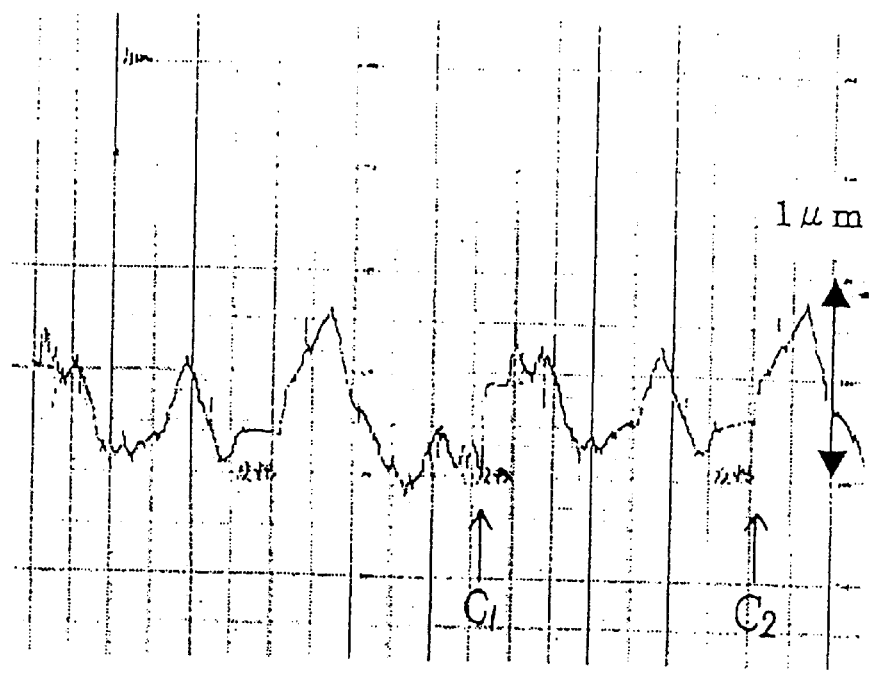
FIGS. 4A and 4B are graphs showing the pitching accuracy and the yawing accuracy when the X-Y stage of the stage system of the embodiment is moved in the Y-axis direction.
Figure 4B:
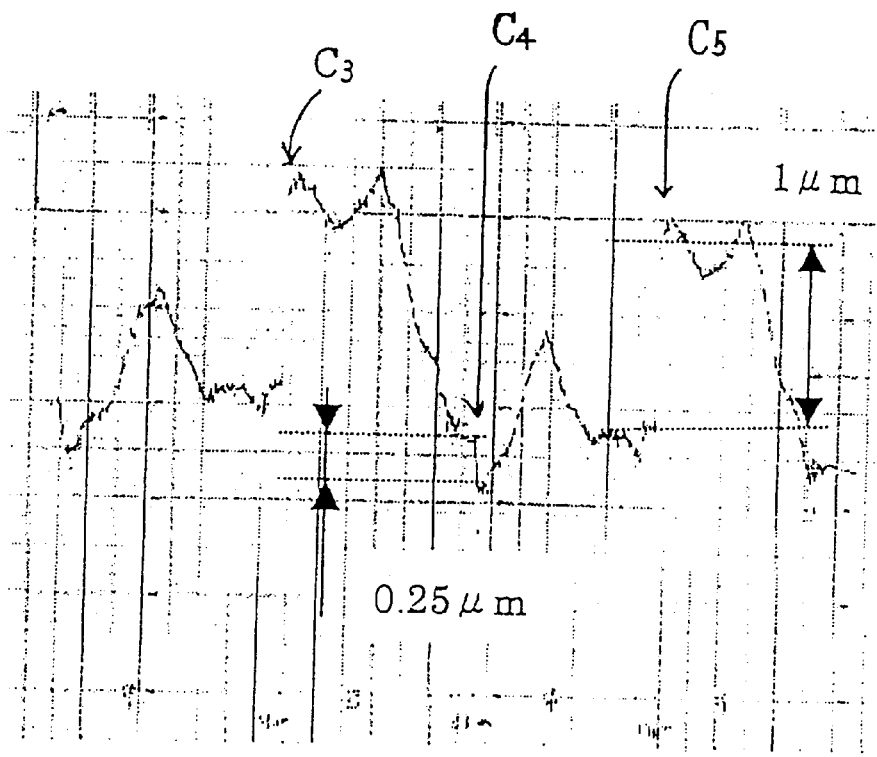
Figure 5:
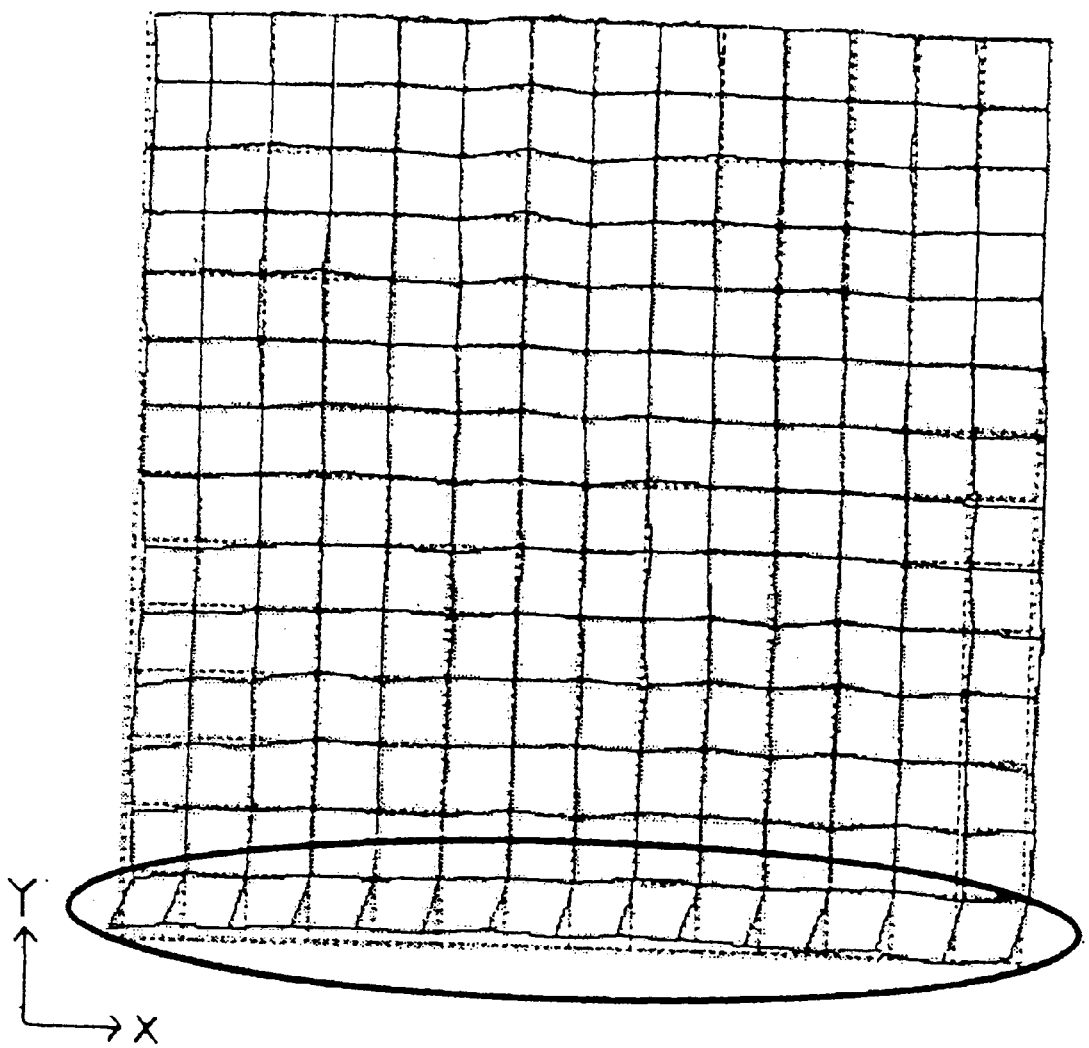
FIG. 5 is a diagram showing the placement accuracy when an X-Y stage is moved by a conventional method.
Figure 6:
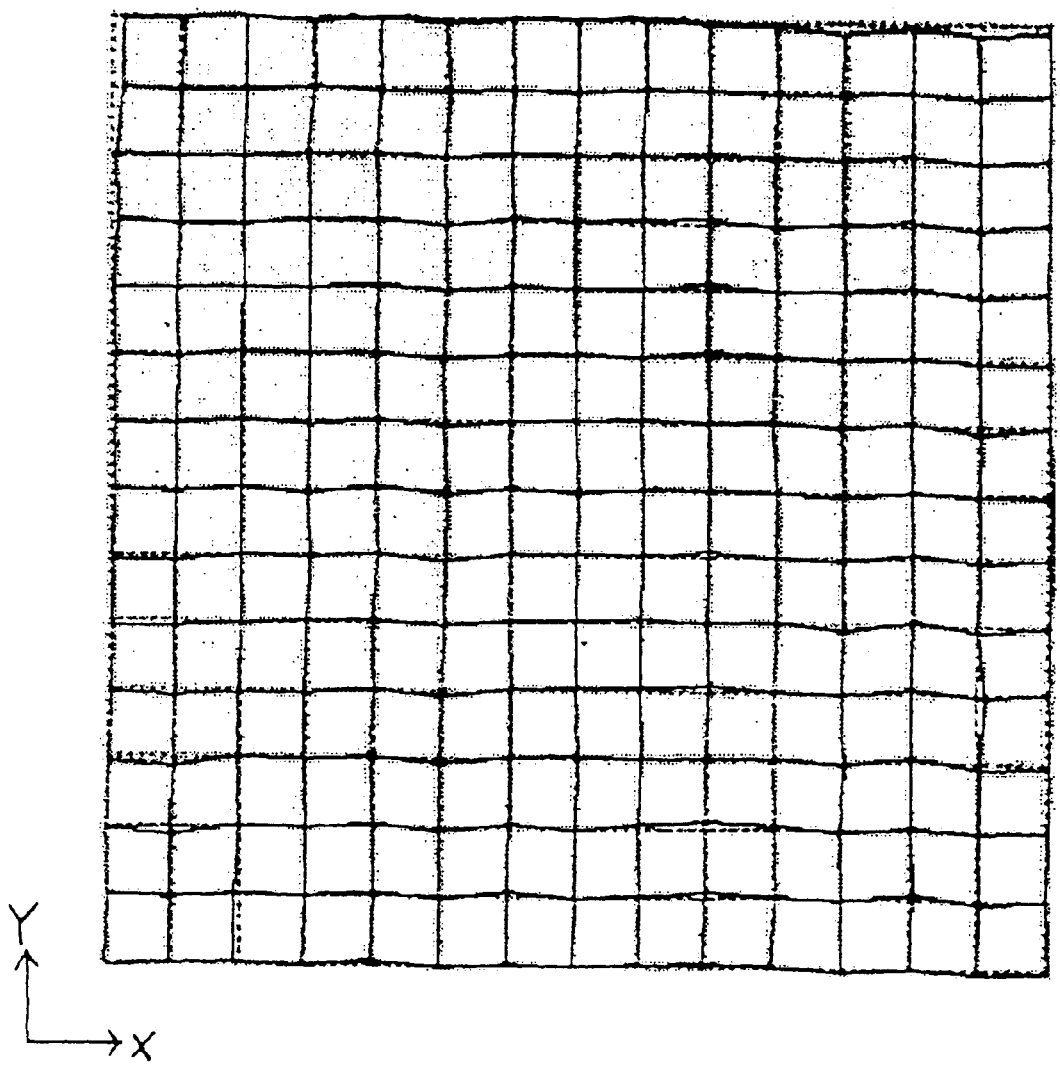
FIG. 6 is a diagram showing the placement accuracy when an X-Y stage is moved by a conventional approach running method.

FIGS. 4A and 4B show the displacement characteristics (stage characteristics) of the ΘZ stage 7 when only the Y-stage 2 shown in FIG. 1 is driven. The abscissas of FIGS. 4A and 4B represent a cumulative value of a motion distance in the Y-axis direction, the ordinate of FIG. 4A represents a displacement amount (pitching amount) in the height direction (Z-axis direction), and the ordinate of FIG. 4B represents a displacement amount (yawing amount) in the X-axis direction.

At positions indicated by arrows $C_1$ and $C_2$ in FIG. 4A, the displacement amounts in the height direction abruptly change immediately after the motion direction of the Y-stage 2 is reversed. However, this change amount is 0.4 μm at most.

At positions indicated by arrows $C_3$ and $C_5$ in FIG. 4B, the displacement amounts in the X-axis direction abruptly change immediately after the motion direction of the Y-stage 2 is reversed from the upward direction to the downward direction (after the motion direction of the processible position in the substrate plane is reversed from the downward direction to the upward direction). Thereafter, the displacement amount is generally straightforward. At a position indicated by an arrow $C_4$, the motion direction of the Y-stage 2 is reversed from the upward direction to the downward direction. In this case, a change in the displacement amount is about 0.25 μm which is smaller than a change in the displacement amounts at the positions $C_3$ and $C_5$.

The graph shown in FIG. 4B indicates that when the motion direction of the Y-stage 2 is reversed from the upward direction to the downward direction, the ΘZ stage 7 moves about 1 μm along the positive X-axis direction. From the detailed analysis of the measurement results, it has been found that the ΘZ stage 7 displaces about 1 μm along the X-axis direction while the Y-stage 2 moves about 5 mm. If the motion of the Y-stage 2 is regular, the displacement along the X-axis direction can be corrected by making the Y-stage 2 approach-run by some distance along the Y-axis direction.

However, as shown in FIG. 7, if the regularity of motion of the stage is disturbed, the displacement in the X-axis direction cannot be corrected only by the approach run along the Y-axis direction. As shown in FIG. 2, by making the ΘZ stage 7 approach-run along the X- and Y-axis directions, the displacement can be corrected as shown in the stage position accuracy shown in FIG. 3, even if the regularity of motion of the ΘZ stage 7 is disturbed.

In other words, the position accuracy of the ΘZ stage 7 can be improved by making the ΘZ stage 7 approach-run along the direction same as the motion directions of the ΘZ stage 7 along the X- and Y-axis directions immediately after the motion direction of the ΘZ stage 7 is reversed.

Since the displacement of 1 μm in the X-axis direction is caused during the stage of the motion of about 5 mm in the Y-axis direction and thereafter the displacement amount is generally straightforward, it is preferable to set the approach distance in the Y-axis direction to 5 mm or longer. If the stage characteristics of the X-stage are similar to the Y-stage, it is preferable to set the approach distance in the X-axis direction also to 5 mm or longer. A preferable approach distance differs for each apparatus. A motion distance in the Y-axis direction is measured until the abrupt change in the displacement amount in the X-axis direction is converged after the motion direction in the Y-axis direction is reversed, and the approach distance is set longer than the measured motion distance.

The present invention has been described in connection with the preferred embodiments. The invention is not limited only to the above embodiments. It is apparent that various modifications, improvements, combinations, and the like can be made by those skilled in the art.

I claim:

1. A processing method comprising:
    a step of holding a workpiece to be processed on an X-Y stage capable of translation motion along X-axis direction and Y-axis direction orthogonal to each other;
    a step of moving the X-Y stage to a first position;
    a step of approach-running the X-Y stage in the X-axis direction and in a negative Y-axis direction and stopping the X-Y stage at a second position;
    a step of processing the workpiece while the X-Y stage stops at the second position; and
    a step of repetitively executing a process of moving the X-Y stage in the negative Y-axis direction by some distance and processing the workpiece while the X-Y stage stops.

2. A processing method according to claim 1, wherein in said step of moving the X-Y stage to the first position, a motion direction of the X-Y stage in the Y-axis direction immediately before the X-Y stage reaches the first position is the positive Y-axis direction.

3. A processing method according to claim 2, wherein in said step of stopping the X-Y stage at the second position, the X-Y stage approach-runs in the X-axis direction same as a direction of error of the X-Y stage when the motion direction of the X-Y stage is reversed from a positive Y-axis direction to the negative Y-axis direction.

4. A processing method according to claim 1, wherein the step of approach-running the X-Y stage, the X-Y stage is moved to the second position without processing the workpiece at the first position.

5. A processing method comprising:

a step of holding a workpiece to be processed on an X-Y stage of a stage system capable of translation motion of the X-Y stage along X-axis direction and Y-axis direction orthogonal to each other; and a step of repeating a first process, a second process and a third process sequentially in this order, the first process repeating a motion and a stop of the X-Y stage in a positive Y-axis direction and processing the workpiece while the X-Y stage stops, the second process moving the X-Y stage in a negative Y-axis direction, and the third process approach-running the X-Y stage obliquely relative to the X-axis direction and Y-axis direction and in the positive Y-axis direction.

6. A processing method according to claim 5, wherein the workpiece is not processed in the second process and the third process and in the first process, the workpiece is processed at a position where the X-Y stage is stopped after the third process.

* * * * *